United States Patent
Nakazawa et al.

[19]

[11] Patent Number: 5,828,022
[45] Date of Patent: Oct. 27, 1998

[54] INHIBITOR SWITCH DEVICE HAVING AN OPERATING LEVER WITH A STRENGTH ADJUSTING PORTION

[75] Inventors: Takashi Nakazawa; Tsutom Watada, both of Tokyo, Japan

[73] Assignee: Niles Parts Co., Ltd., Japan

[21] Appl. No.: 826,123

[22] Filed: Mar. 27, 1997

[30]  Foreign Application Priority Data

Mar. 28, 1996  [JP]  Japan .................................... 8-099022

[51] Int. Cl.⁶ ............................. H01H 9/06; H01H 21/22; H01H 21/78
[52] U.S. Cl. ...................... 200/61.88; 200/11 R; 200/336
[58] Field of Search ........................... 200/11 R, 11 TW, 200/61.88–61.91, 553, 335, 336

[56]  References Cited

U.S. PATENT DOCUMENTS

| | | | |
|---|---|---|---|
| 4,604,506 | 8/1986 | Gebhardt | 200/61.89 |
| 4,897,513 | 1/1990 | Oka et al. | 200/11 EA |
| 5,679,937 | 10/1997 | Iwata | 200/61.88 |
| 5,693,925 | 12/1997 | Yamada et al. | 200/61.88 |

FOREIGN PATENT DOCUMENTS

HEI2-145736  12/1990  Japan .
2 300 759  11/1996  United Kingdom .

*Primary Examiner*—J. R. Scott
*Attorney, Agent, or Firm*—Rader, Fishman & Grauer

[57]  ABSTRACT

An inhibitor switch device having an operating lever 9 equipped with a strength adjusting portion 96 near the rotating axle. The strength adjusting portion 96 has a mass which can be adjusted by using a nested-type metal molding. The strength adjusting portion 96 allows the operating lever 9 to be set to a suitable strength so that the operating lever 9 breaks when an abnormal external force is applied. Also, when an abnormal external force is applied, the strength adjusting portion 96 prevents the spread of breakage to the rotating axle, and allows easy detection of defective products by an external check of the strength adjusting portion. In addition, the strength adjusting portion allows fine adjustment of the operating lever 9 to a suitable strength during formation thereof, thereby preventing the strength adjusting portion from being broken under regular external forces.

5 Claims, 5 Drawing Sheets

INHIBITOR SWITCH DEVICE HAVING AN OPERATING LEVER WITH A STRENGTH ADJUSTING PORTION

BACKGROUND OF THE INVENTION

1. Field of the Invention

The present invention relates generally to an inhibitor switch that detects the position of an automatic gear shifter of an automobile and, in particular, to an inhibitor switch device having an operating lever equipped with a strength adjusting portion to prevent breakage from spreading to a rotating axle thereof.

2. Description of the Related Art

An inhibitor switch device related to the present invention has been used as a switch to detect the position of an automatic gear shifter of an automobile. Such an inhibitor switch device is disclosed, for example, in Japanese Laid Open Patent Publication No. Hei 2(1990)-145736.

FIGS. 10 and 11 illustrate an example of a conventional inhibitor switch device. The conventional inhibitor switch device includes a case b that has a bearing hole a, a rotating axle c that fits into the bearing hole a so that the rotating axle c moves freely, a movable plate d that is integrated with the rotating axle c and moves freely in the case b, a movable contact point e on the movable plate d, a fixed contact point f that corresponds with the movable contact point e, a platform g that supports the fixed contact point f and houses the movable plate d by connecting with the case b, and an operating lever i that is fixed to the rotating axle c and, at the same time, moves freely on an external surface h of the case b. Two stoppers h1 and h2 are provided on the external surface h of the case b. Each edge i2 and i3 of the operating lever i impacts one of the stoppers h1 and h2, so that the range of movement θ of the operating lever i is limited.

The rotating axle c is comprised of metal materials and is formed by insertion molding into the operating lever i. An O-ring j is installed on the rotating axle c and seals the gap between the rotating axle c and the case b. Furthermore, the rotating axle c is fixed to the movable plate d using a nut k. A connector g1 is integrated into the platform g, and a terminal g2 is electrically connected with the fixed contact point f inside the connector g1.

In an inhibitor switch device that has the above-described structure, a connecting hole i1 of the operating lever i is connected to the manual valve of an automatic gear shifter (not shown) or a shift lever by the driver's seat (not shown) of a vehicle, for example, so that when the operating lever i moves along with the movement of the shift lever, the movable plate d within the case b moves along with the operating lever i, and the movable contact point e moves in and out of connecting positions with the fixed point f. The fixed point f is connected to a controller (not shown) via a terminal g2, so that the controller can control each action by on/off signals that correspond to the shifter position.

The conventional inhibitor switch device described above becomes easy to break due to an external force when using a resin for the rotating axle c and the operating lever i. Moreover, when the inside of the rotating axle c is broken, it cannot be discovered by an external check of the inhibitor switch device. Therefore, it is possible to mount a defective inhibitor switch device in which the rotating axle c is broken. In order to solve this problem, it is possible that a weak point can be provided in the operating lever so that when an abnormal external force is applied, the weak point will break, thereby facilitating the external checking.

However, it is difficult to adjust the strength of the weak point so that it does not break under normal external forces.

SUMMARY OF THE INVENTION

An object of the present invention is to solve the problems with the conventional inhibitor switch devices described above.

More specifically, it is an object of the present invention to provide a strength adjusting portion that is easy to break when an abnormal external force is applied to the operating lever, so that breakage does not spread to the rotating axle, as well as allowing the detection of defective products easily with an external check of the strength adjusting portion.

It is a further object of the present invention to provide an operating lever having a strength adjusting portion that can be finely adjusted to a suitable strength so that the strength adjusting portion does not break under a normal external force for a particular switch application.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, an inhibitor switch device is provided, comprising: a case with a bearing hole; a rotating axle that fits into the bearing hole so that the rotating axle rotates freely; a movable plate that moves freely in the case, the movable plate being integrated with the rotating axle; a movable contact point supported on the movable plate; a fixed contact point that corresponds with the movable contact point; a platform that supports the fixed contact point and houses the movable plate in conjunction with the case; and an operating lever that is fixed to the rotating axle and moves on an external surface of the case; the operating lever having a strength adjusting portion that adjusts the strength of the operating lever near the rotating axle.

A suitable strength is given to the strength adjusting portion by adjusting the mass of the strength adjusting portion so that the strength adjusting portion is broken when an abnormal external force is applied to the operating lever. The strength adjusting portion comprises a plurality of longitudinally extending grooves formed on a lower side of the operating lever. The longitudinally extending grooves extend from an end point of the operating lever adjacent the rotating axle to an intermediate point of the operating lever spaced from the rotating axle. The strength of the strength adjusting portion can be precisely adjusted by changing a width of the longitudinally extending grooves. The strength adjusting portion can thereby be finely adjusted for a given switch application so that the operating lever will break when an abnormal external force is applied, but will not break when a normal external force is applied.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENTS

Figure 1:
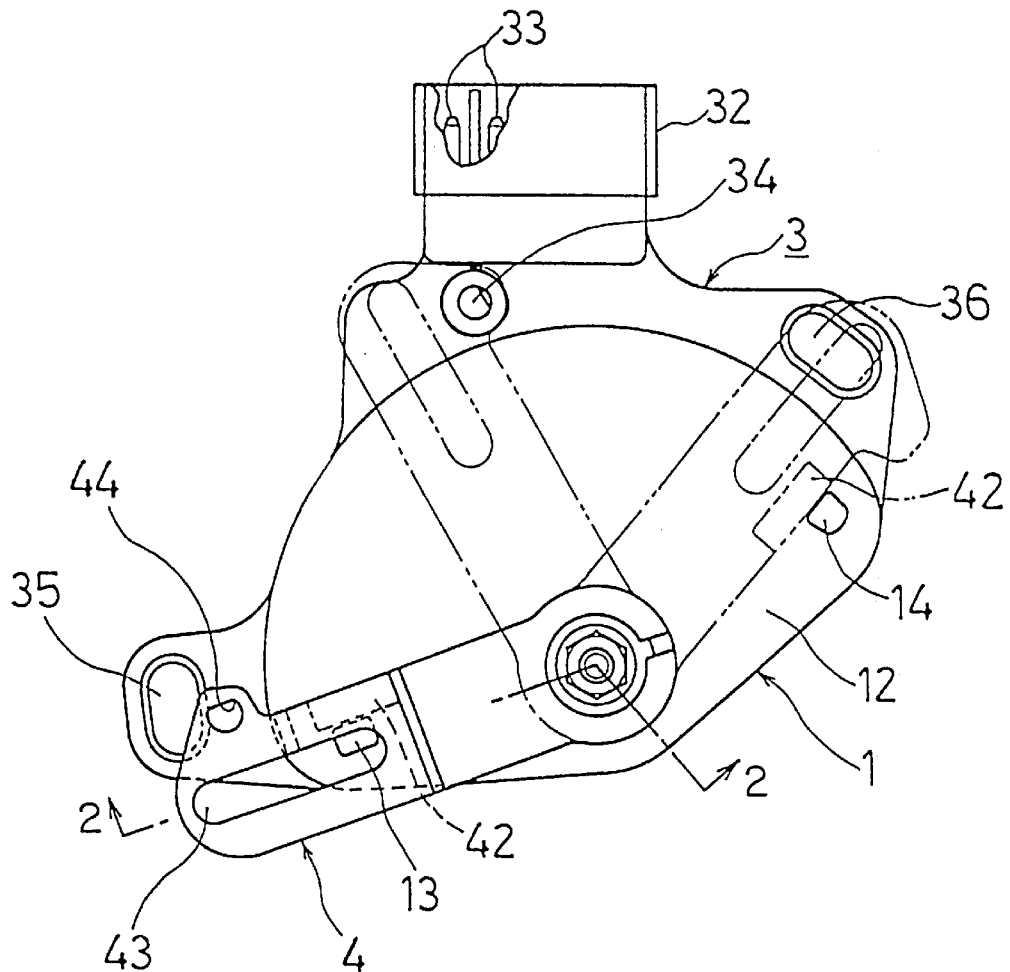
FIG. 1 is a plan view of an inhibitor switch device according to a first embodiment of the present invention.
Figure 2:
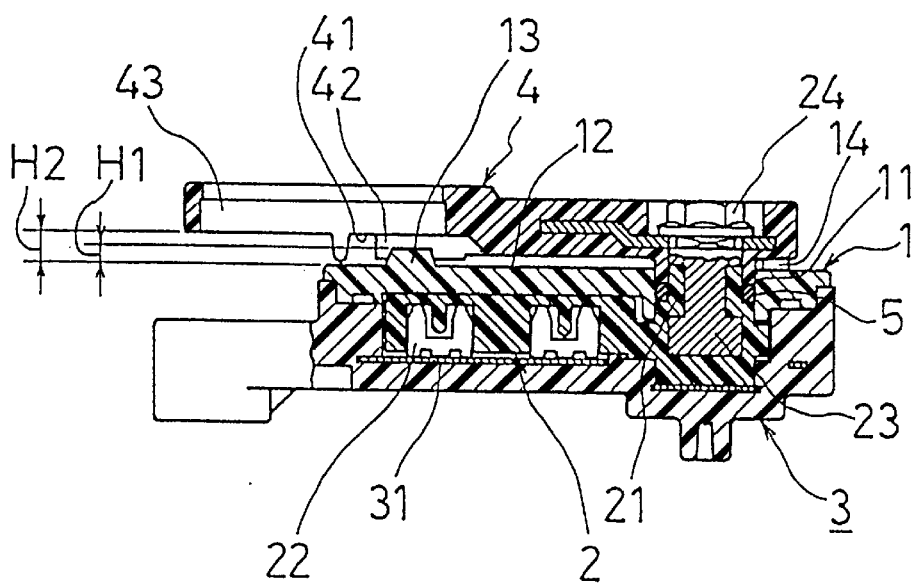
FIG. 2 is a cross-sectional side view of the inhibitor switch device according to the first embodiment of the present invention as viewed along the line 2—2 in FIG. 1.

A first embodiment of an inhibitor switch device according to the present invention will now be described in detail with reference to FIGS. 1 and 2 of the drawings.

A case 1 is made from a synthetic resin and has a bearing hole 11 that fits a rotating axle 21 (described below) so that the rotating axle 21 rotates freely. A movable plate 2 is made out of a synthetic resin, such as, for example, polyphenylene sulfide (PPS). The movable plate 2 is integral with the rotating axle 21 and has a movable contact point 22 on a bottom portion thereof. A metal shaft 23 is formed by insertion molding within the rotating axle 21. An operating lever 4 is fixed to the rotating axle 21 by tightly threading a nut 24 onto the shaft 23, so that the operating lever 4 and the movable plate 2 interlock and move with the rotating axle 21 on an axis. The operating lever 4 can move freely on an external surface 12 of the case 1, and the movable plate 2 can move freely within the case 1.

A platform 3 supports a fixed contact point 31, which corresponds with the movable contact point 22. The fixed contact point 31 is insertion molded into the platform 3 and is electrically connected with a terminal 33. A connector 32 is integrated with the platform for connecting the inhibitor switch device to an external wire harness or the like (not shown). The platform 3 is connected with the case 1 by ultrasonic bonding or the like, which forms a sealed space between the platform 3 and the case 1. The movable plate 2 is housed within the sealed space. A gap between the rotating axle 21 and the bearing hole 11 is sealed with an O-ring 5 that is mounted on the rotating axle 21.

The operating lever 4 has a slit 43, which is connected to a manual valve (not shown) of an automatic gear shifter or shift lever (not shown) by a driver's seat so that the operating lever 4 moves when the shift lever is operated. The operating lever 4 has a projected portion 42 on its bottom side 41. Also, the case 1 has stoppers 13 and 14 on an external wall 12. The projected portion 42 impacts the stoppers 13 and 14. A height H1 of the stoppers 13 and 14 from the external wall 12 is set lower than a height H2, which is the height of the bottom side 41 of the operating lever 4 from the external wall 12. Therefore, only the projected portion 42 of the operating lever 4 impacts with the stoppers 13 and 14 of the case 1.

In addition, the operating lever 4 has a positioning portion 44. The positioning portion 44 is used for mounting the inhibitor switch device onto an automatic gear case (not shown) in an appropriate position. The platform 3 has a positioning hole 34 that corresponds with the positioning portion 44. When the inhibitor switch device is mounted on an automatic gear case, a pin (not shown) is pushed through both the positioning portion 44 of the operating lever 4 and the positioning hole 34 of the platform 3 to determine a proper position of the operating lever 4. Then, bolts (not shown) are put through slots 35 and 36 of the platform 3 and fastened to the automatic gear case.

An operation of the inhibitor switch device according to the first embodiment will now be explained.

First, when the driver in the vehicle operates the shift lever, its operation power is transmitted to the automatic gear shifter via an arm on the lower portion of the shift lever to a control cable, which interconnects with the operating lever 4. The operating lever 4 is thereby driven and moves over the external wall 12 of the case 1. When the operating lever 4 moves, the movable plate 2 moves inside the case 1, and the connecting position of the movable contact point 22 and the fixed contact point 31 is switched. Then, the fixed contact point 31 inputs an on/off signal, which corresponds to the shift position, to a controller (not shown) via the terminal 33. Then, the controller conducts a control according to the input signal.

A second embodiment of an inhibitor switch device according to the present invention will now be described in detail with reference to FIGS. 3 to 9 of the drawings.

A case 6 is made from synthetic resin and has a bearing hole 61 that fits a rotating axle 71 (described below) so that the rotating axle 71 rotates freely. A movable plate 7 is made from synthetic resin, such as, for example, PPS resin. The movable plate 7 is integral with the rotating axle 71 and has a movable contact point 72 on a bottom portion thereof. An operating lever 9 is bonded by ultrasonic bonding to the rotating axle 71, so that the operating lever 9 and the movable plate 7 move together with the rotating axle 71 as the axis of rotation. The operating lever 9 moves freely on an external surface 62 of the case 6, and the movable plate 7 is freely movable inside the case 6.

Figure 6:
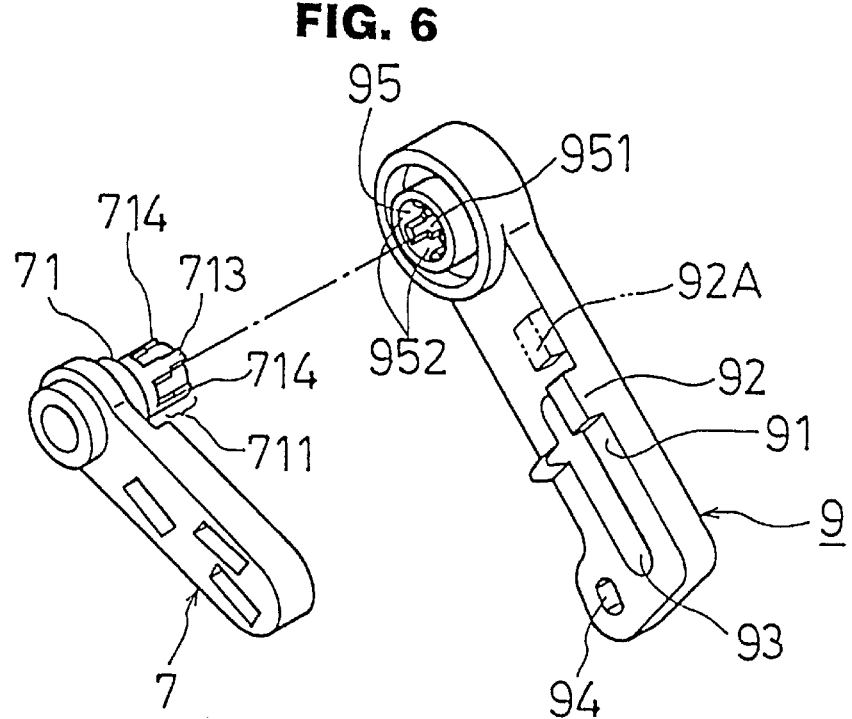
FIG. 6 is a perspective view of the movable plate and operating lever used in the inhibitor switch device shown in FIG. 3 to 5.
Figure 7:
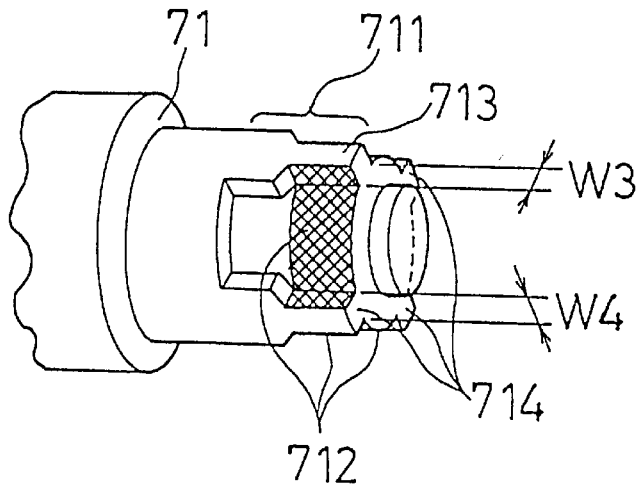
FIG. 7 is an enlarged perspective view of a rotating torque bearing of the movable plate shown in FIG. 6.
Figure 8:
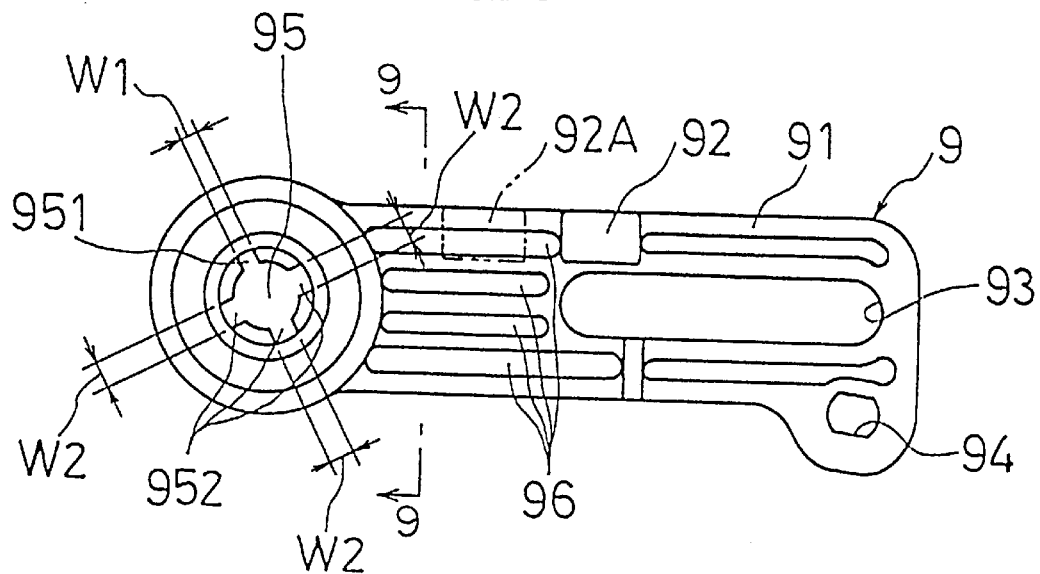
FIG. 8 is an enlarged plan view of the operating lever shown in FIG. 3 as viewed from below.

As shown in FIGS. 6 and 7, the movable plate 7 has a rotating torque bearing 711. The rotating torque bearing 711 has a projecting portion 713 and projecting portions 714, which are organized with interlocking teeth on the rotating axle 71. As shown in FIGS. 6 and 8, the operating lever 9 has gutters 951 and 952 and a bonding hole 95 into which the rotating torque bearing 711 fits. In order to ultrasonically bond the rotating axle 71 and the operating lever 9, the rotating axle 71 is initially inserted into the bearing hole 61 from the inside of the case 6. Then, the gutters 951 and 952 and the bonding hole 95 of the operating lever 9 are fitted into the rotating torque bearing 711, which is projected onto the external wall 62 side of the case 6. Then, ultrasonic waves are added from the operating lever 9 side with an ultrasonic bonding head (not shown). Then, a bonding spot 712 of the rotating torque bearing 711 is bonded to the gutters 951 and 951 and the bonding hole 95 of the operating lever 9.

As shown in FIG. 8, a width W1 of the gutter 951 on the operating lever 9 is set narrower than a width W2 of the other gutters 952. Similarly, on the rotating axle 71, a width W3 of the projecting portion 713 of the rotating torque bearing 711 is set narrower than a width W4 of the other projecting portions 714, as shown in FIG. 7. The formula showing this relation of the widths is W3≦W1<W4≦W2. By setting the widths in this manner, the relative positioning between the movable plate 7 and the operating lever 9 during assembly can be standardized to prevent improper assembly.

A platform 8 supports a fixed contact point 81, which corresponds with the movable contact point 72. The fixed contact point 81 is insertion molded into the platform 8 and is electrically connected with a terminal 83. A connector 82 is integrated with the platform 8 for connecting the inhibitor switch device to an external wire harness or the like (not shown). The platform 8 is connected with the case 6 by ultrasonic bonding or the like, which forms a sealed space between the platform 8 and the case 6. The movable plate 7 is housed within the sealed space. A gap between the rotating axle 71 and the bearing hole 61 is sealed with an O-ring 10 that is mounted on the rotating axle 71.

The operating lever 9 has a coupling slot 93, which is a slot-shaped hole. The coupling slot 93 is coupled to the manual valve of an automatic gear shifter or the shift lever between the car seats so that the operating lever 9 moves when the shift lever is operated. The operating lever 9 has a projecting portion 92 on a bottom side 91 thereof. The case 6 has stoppers 64 and 65 protruding from an external wall 62 thereof. A height of the stopper 64 from the external wall 62 is set smaller than a height of the bottom side 91 of the operating lever 9 from the external wall 62. In addition, a height of the stopper 65 from the external wall 62 is set larger than a height of the bottom side 91 of the operating lever 9 from the external wall 62. Therefore, the projecting portion 92 impacts the stopper 64 at a moving position P1 shown in FIG. 3. In addition, the side 97 of the operating lever 9 impacts the stopper 65 at a moving position P2.

The case 6 contains stoppers 63 and 66 in addition to the stoppers 64 and 65. The stoppers 63 and 66 function to change the moving position of the operating lever 9 from the moving positions P1 and P2 shown in FIG. 3 to the moving positions P3 and P4 shown in FIG. 5 by changing the location of the projecting portion 92A of the operating lever 9 without changing the case 6.

Figure 3:
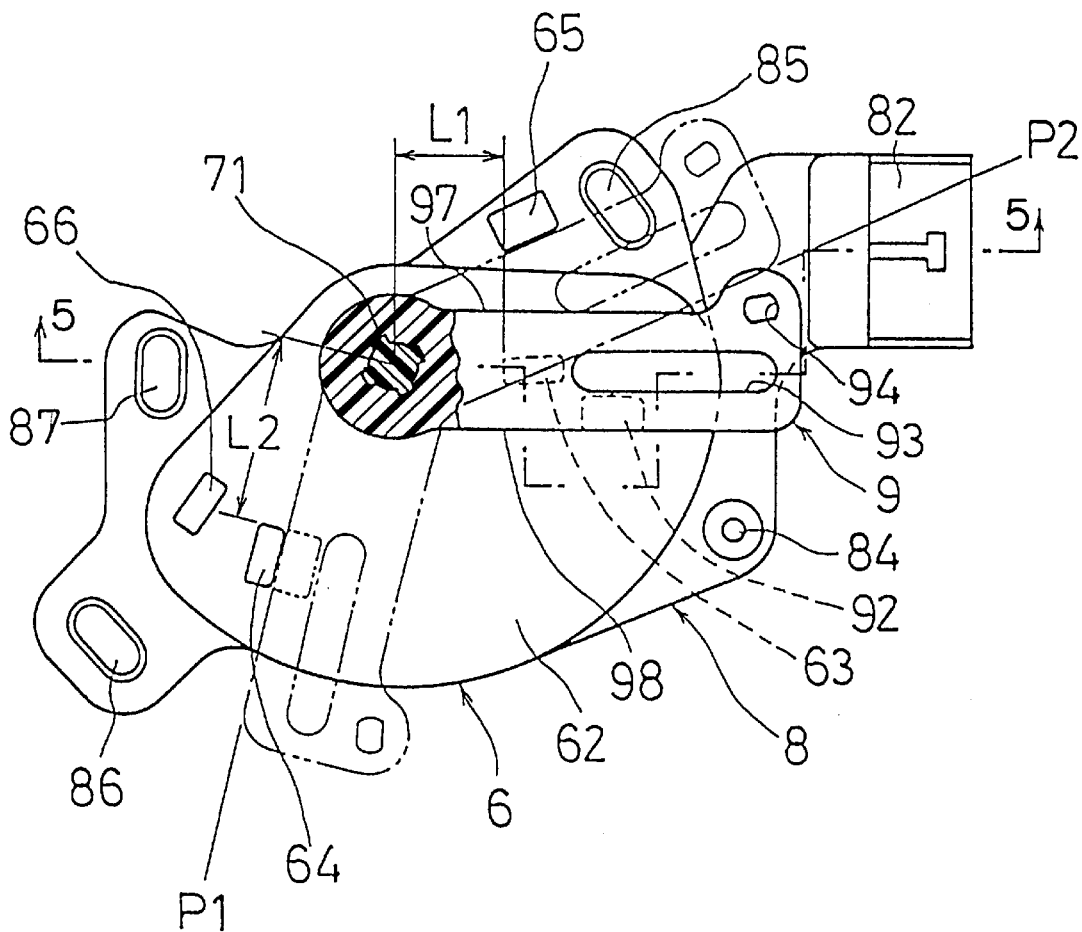
FIG. 3 is a plan view in partial section of an inhibitor switch device according to a second embodiment of the present invention.
Figure 4:
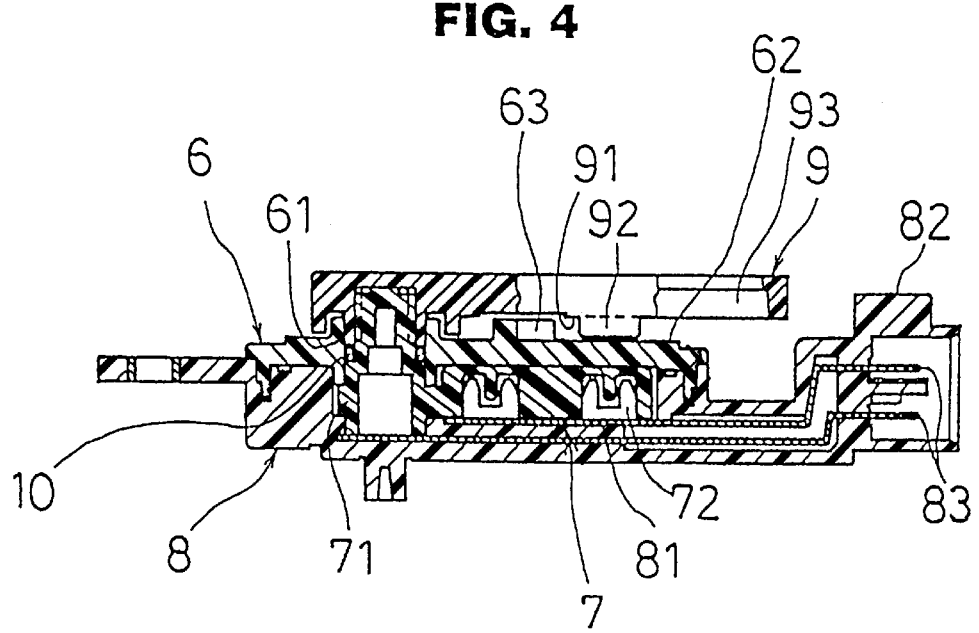
FIG. 4 is a cross-sectional side view of the inhibitor switch device according to the second embodiment of the present invention as viewed along the line 5—5 in FIG. 3.
Figure 5:
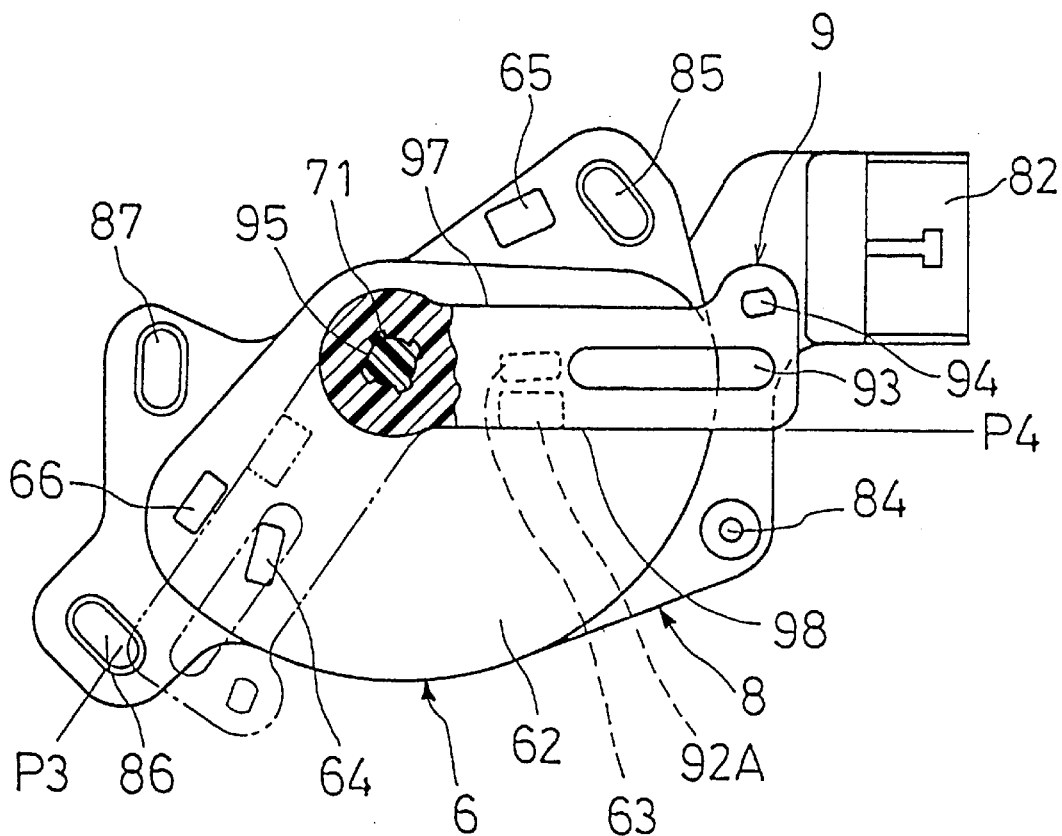
FIG. 5 is a plan view in partial section of the inhibitor switch device shown in FIG. 3 with the location of the operating lever changed.

Specifically, the operating lever 9 can be replaced or altered so that it has a projected portion 92A at the position shown with dotted lines in FIG. 5 and dashed lines in FIGS. 6 and 8, instead of a projected portion 92 at the position shown in FIG. 3. The height of the stopper 63 from the external wall 62 is set lower than the height from the external wall 62 to the bottom side 91 of the operating lever 9. The height of the stopper 66 from the external wall 62 is set higher than the height from the external wall 62 to bottom side 91 of the operating lever 9. In addition, the distance L1 from the center of the rotating axle 71 to the stopper 63 is set shorter than the distance L2 from the center of the rotating axle 71 to the stopper 64. The stopper 63 is positioned in alignment with the path of movement of the projecting portion 92A on the operating lever 9A. Therefore, the projecting portion 92A impacts the stopper 63 at the moving position P4, as shown in FIG. 5, and the other side 98 of the operating lever 9 impacts the stopper 66 at the moving position P3.

Figure 9:
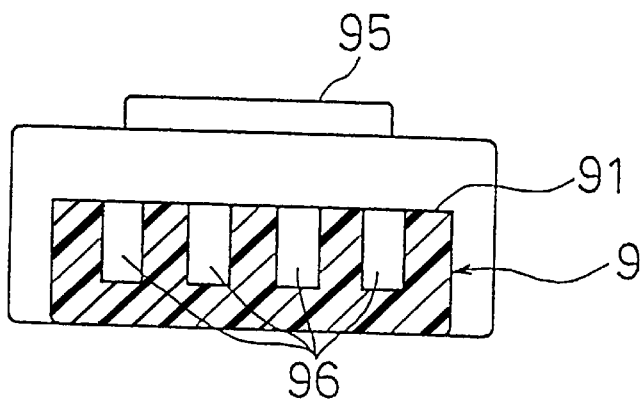
FIG. 9 is a cross-sectional view of the operating lever as viewed along the line 9—9 in FIG. 8.
Figure 10:
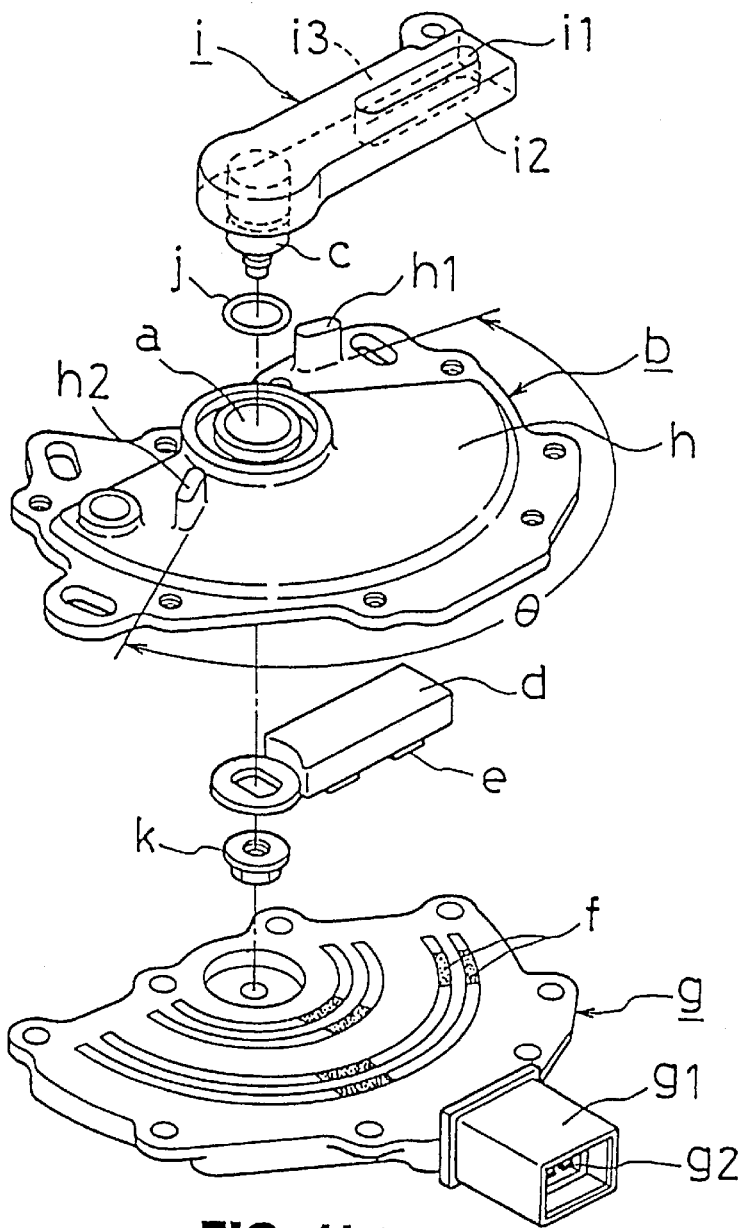
FIG. 10 is an exploded perspective view of a conventional inhibitor switch device.
Figure 11:
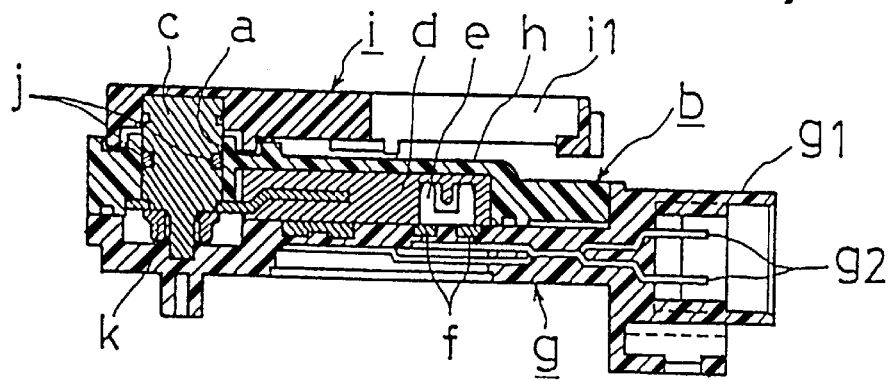
FIG. 11 is a cross-sectional side view of the conventional inhibitor switch device shown in FIG. 10.

The operating lever 9 has a strength adjusting portion 96, as shown in FIGS. 8 and 9. The strength adjusting portion 96 is a portion to adjust the strength of the operating lever 9 so as to control the location of any breakage that might occur in the operating lever 9. The strength adjusting portion 96 is set at an appropriate strength so that the operating lever 9 will not be broken by a regular external force during normal operation of the operating lever 9. However, when an unexpected external force is applied, the operating lever 9 is designed to break at the strength adjusting portion 96, instead of at the rotating axle 71. For example, if the operating lever 9 accepts an external force in an up and down direction while driving the vehicle in addition to the normal rotating force, or if the operating lever 9 is stressed while installing the inhibitor switch device, the strength adjusting portion 96 will break without causing damage to the rotating axle 71.

The strength adjusting portion 96 comprises a plurality of grooves extending in a longitudinal direction on a lower side of the operating lever 9. The grooves extend from an end point of the operating lever 9 adjacent the rotating axle 71 to an intermediate point of the operating lever 9 spaced from the rotating axle 71. The strength of the strength adjusting portion 96 can be adjusted by changing the size of the width of the grooves during the process of molding the operating lever 9 in a metal mold. Moreover, a plurality of metal molds having different groove widths can be used to provide operating levers 9 having different strengths. The operating levers 9 having different strengths based on the groove width of the strength adjusting portion 96 can be used to provide an operating lever 9 having the precise strength necessary and suitable for each switch application.

In addition, the operating lever 9 has a positioning portion 94. The positioning portion 94 is for mounting the inhibitor switch device onto an automatic gear case (not shown) in the appropriate position. The platform 8 has a positioning hole 84 that matches with the positioning portion 94. When the inhibitor switch device is mounted on an automatic gear case, a pin (not shown) is pushed through both the positioning portion 94 of the operating lever 9 and the positioning hole 84 of the platform 8. Then, bolt (not shown) are inserted into the slots 85 and 86 of the platform 8 to fasten the platform 8 onto the automatic gear case. The operation of the second embodiment is generally the same as the first embodiment described above and, therefore, a further explanation will be omitted.

As described above, the invention has a strength adjusting portion that adjusts the strength of the operating lever near the rotating axle, so that when an abnormal external force is applied, the strength adjusting portion can prevent breakage from spreading to the rotating axle. Also, the operating lever is structured so that the strength of the operating lever can be adjusted by changing a width of the longitudinal grooves formed in the strength adjusting portion of the operating lever, thereby allowing the strength adjusting portion to be finely adjusted so that the breakage point can be set so that the operating lever does not break under a regular external force, but will break when an abnormal external force is applied.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. An inhibitor switch device, comprising:

a case (1, 6) with a bearing hole (11, 61);

a rotating axle (21, 71) that fits into said bearing hole (11, 61) so that said rotating axle rotates freely;

a movable plate (2, 7) that moves freely in said case (1, 6), said movable plate being integrated with said rotating axle (21, 71);

a movable contact point (22, 72) supported on said movable plate (2, 7);

a fixed contact point (31, 81) that corresponds with said movable contact point (22, 72);

a plateform (3, 8) that supports said fixed contact point (31, 81) and houses said movable plate (2, 7) in conjunction with said case (1, 6); and an operating lever (4, 9) that is fixed to said rotating axle (21, 71) and moves on an external surface (12, 62) of said case (1, 6), said operating lever (9) having a strength adjusting portion (96) that adjusts the strength of said operating lever (9) near said rotating axle (71);

wherein said strength adjusting portion comprises a plurality of longitudinally extending grooves formed in said operating lever.

2. The inhibitor switch device according to claim 1, wherein said longitudinally extending grooves extend from an end point of said operating lever adjacent said rotating axle to an intermediate point of said operating lever spaced from said rotating axle.

3. The inhibitor switch device according to claim 1, wherein said longitudinally extending grooves are formed on a lower side of said operating lever facing said external surface of said case.

4. The inhibitor switch device according to claim 1, wherein the strength of said strength adjusting portion of said operating lever is adjusted by changing a width of said longitudinally extending grooves so that the strength adjusting portion will be broken when an abnormal external force is applied to said operating lever but will not be broken when a normal external force is applied to said operating lever.

5. The inhibitor switch device according to claim 1, wherein said strength adjusting portion is constructed so as to prevent any breakage of said inhibitor switch device from spreading to said rotating axle.

* * * * *